US009170830B2

(12) United States Patent
Shiba et al.

(10) Patent No.: US 9,170,830 B2
(45) Date of Patent: Oct. 27, 2015

(54) METHOD FOR CONTROLLING PROGRAM EXECUTION

(71) Applicant: FUJITSU LIMITED, Kawasaki-shi, Kanagawa (JP)

(72) Inventors: Nobuo Shiba, Yokohama (JP); Hiroshi Sasaki, Yokohama (JP); Shinya Suematsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 14/156,748

(22) Filed: Jan. 16, 2014

(65) Prior Publication Data

US 2014/0298305 A1 Oct. 2, 2014

(30) Foreign Application Priority Data

Mar. 26, 2013 (JP) ................................. 2013-065039

(51) Int. Cl.

| | |
|---|---|
| ***G06F 12/00*** | (2006.01) |
| ***G06F 9/44*** | (2006.01) |
| ***G06F 9/45*** | (2006.01) |
| ***G06F 9/46*** | (2006.01) |
| ***G06F 9/455*** | (2006.01) |

(52) U.S. Cl.
CPC .................................... *G06F 9/4552* (2013.01)

(58) Field of Classification Search
CPC . G06F 9/30087; G06F 9/467; G06F 9/45516; G06F 9/45533; G06F 9/4881; G06F 9/5066; G06F 8/433; G06F 8/443; G06F 8/4441; G06F 8/4443; G06F 11/3604; G06F 11/3447; G06F 11/3466; G06F 11/3419; G06F 11/3664
See application file for complete search history.

(56) References Cited

U.S. PATENT DOCUMENTS

| | | | |
|---|---|---|---|
| 5,970,249 A | 10/1999 | Hölzle et al. | |
| 8,370,823 B2 * | 2/2013 | Bashkansky et al. | 717/154 |
| 2001/0042241 A1 * | 11/2001 | Tsuboi | 717/5 |

(Continued)

FOREIGN PATENT DOCUMENTS

| | | |
|---|---|---|
| JP | 11-237989 | 8/1999 |
| JP | 2004-259252 | 9/2004 |

(Continued)

*Primary Examiner* — Don Wong
*Assistant Examiner* — Anibal Rivera
(74) *Attorney, Agent, or Firm* — Staas & Halsey LLP

(57) ABSTRACT

An execution-target program is executed, via a program-execution control program, by converting a byte code in the execution-target program into a native code based on a predetermined condition. Upon activating the execution-target program, it is determined whether the execution-target program is an optimization-completed program having a past record of having been converted into an optimized state of the execution-target program, based on a profile including information identifying the optimization-completed program and optimized-code information indicating an optimized code for the optimization-completed program, where the profile is updated at a timing of executing the program-execution control program or another program-execution control program, and the optimized code is generated by converting a byte code into a native code. When the execution-target program is the optimization-completed program, upon activating the execution-target program, a byte code corresponding to the optimized-code information from among byte codes of the execution-target program is converted into a native code.

8 Claims, 21 Drawing Sheets

(56) References Cited

U.S. PATENT DOCUMENTS

| | | | | |
|---|---|---|---|---|
| 2003/0101443 | A1* | 5/2003 | Kosche et al. | 717/158 |
| 2004/0054992 | A1* | 3/2004 | Nair et al. | 717/138 |
| 2004/0168162 | A1 | 8/2004 | Park et al. | |
| 2004/0205738 | A1 | 10/2004 | Yoshida et al. | |
| 2007/0033578 | A1* | 2/2007 | Arnold et al. | 717/130 |
| 2007/0226714 | A1 | 9/2007 | Doi | |
| 2008/0092128 | A1* | 4/2008 | Corry et al. | 717/158 |
| 2009/0271772 | A1* | 10/2009 | Stephenson et al. | 717/145 |
| 2011/0010715 | A1* | 1/2011 | Papakipos et al. | 718/100 |
| 2011/0016460 | A1* | 1/2011 | Archambault et al. | 717/158 |
| 2011/0145503 | A1* | 6/2011 | Erez et al. | 711/125 |
| 2011/0202907 | A1* | 8/2011 | Dice et al. | 717/148 |
| 2014/0047423 | A1* | 2/2014 | Pizlo et al. | 717/153 |

FOREIGN PATENT DOCUMENTS

| | | |
|---|---|---|
| JP | 2004-326760 | 11/2004 |
| JP | 2004-355277 | 12/2004 |
| JP | 2007-334643 | 12/2007 |
| JP | 2011-002976 | 1/2011 |

* cited by examiner

FIG. 6A

```
public class OrdinaryDeposit {
    Logger logger;                                              ── M1

    public int balanceInquiry(int id) {
        int result;
        logger.info(" balanceInquiry(START):id=" + id); // audit log

        if (id <= 0) {
            throw new InvalidParameterException();
        }
        Connection conn = getConnection(); // get DB connection
        try {
            PreparedStatement pstmt =
                conn.prepareStatement(
                    "SELECT account_balance   FROM account_tbl
                        WHERE account_id = ?");
            pstmt.setInt(1, id);
            ResultSet rs = pstmt.executeQuery();
            result = rs.getInt(1);
        } catch (SQLException e) {
            logger.error(e.getSQLState())
        } finally {
            if (conn!=null)   conn.close();
        }
        logger.info(" balanceInquiry(END):id=" + id);
        return result;
    }

    public void makeDeposit(int id, int depositAmount){
        logger.info("makeDeposit(START):id=" + id); // audit log
        if (id <= 0) {
            throw new InvalidParameterException();
        }
        if (depositAmount <= 0) {
            throw new InvalidParameterException();
        }
        Connection conn = getConnection(); // get DB connection
        try {
            PreparedStatement pstmtSelect = conn.prepareStatement(
                "SELECT account_balance FROM account_tbl
                    WHERE account_id = ?");
            pstmtSelect.setInt(1, id);
            ResultSet rsSelect = pstmtSelect.executeQuery();
            int balance = rsSelect.getInt(1);
            int newBalance = balance + depositAmount;
                        《CONTINUES》
```

FIG. 6B

```
                    <<CONTINUED>>
    PreparedStatement pstmtUpdate = conn.prepareStatement(
        "UPDATE account_tbl SET account_balance = ? WHERE account_id = ?");
    pstmtUpdate.setInt(1, newBalance);
    pstmtUpdate.setInt(2, id);
    int numOfrow = pstmtUpdate.executeUpdate();
    if(numOfrow!=1) {
        logger.error("unexpected update!");
        conn.rollback();
        throw new Exception("unexpected update!");
    }
    conn.commit();
} catch (SQLException e) {
    logger.error(e.getSQLState());
} finally {
    conn.close();
}
    logger.info("makeDeposit(END):id=" + id);
}
    ...
}
```

FIG. 7

```
    public class OrdinaryDeposit {
        Logger logger;
        public int balanceInquiry(int id) {                                          M1
①           int result;
②           logger.info("balanceInquiry(START):id=" + id); // audit log             B2
③           if (id <= 0) {                                                           B3
                throw new InvalidParameterException();
            }
⑥           Connection conn = null;                                                  B6
            try {                                                                    B7
                conn = getConnection();                                              B8
                PreparedStatement pstmt =
                    conn.prepareStatement(
                    "SELECT account_balance   FROM account_tbl
                        WHERE account_id = ?");
                pstmt.setInt(1, id);
                ResultSet rs = pstmt.executeQuery();
                result = rs.getInt(1);
            } catch (SQLException e) {
                logger.error(e.getSQLState())
            } finally {
⑯               if (conn!=null)   conn.close();                                      B16
            }
⑱           logger.info("balanceInquiry(END):id=" + id);                             B18
            return result;                                                           B19
        }
        public void makeDeposit(int id, int depositAmount) {                         M2
            logger.info("makeDeposit(START):id=" + id); // audit log
            if (id <= 0) {
                throw new InvalidParameterException();
            }
            if (depositAmount <= 0) {
                throw new InvalidParameterException();
            }
            Connection conn = getConnection(); // get DB connection
            try {
                ...
    }
```

| METHOD IDENTIFIER | EXECUTION COUNT | BYTE CODE SIZE | NATIVE CODE SIZE | OPTIMIZED BLOCKS | OPTIMIZATION COMPLETED |
|---|---|---|---|---|---|
| balanceInquiry | 100 | 80 | 1324 | 2, 3, 6, 7, 8, 16, 18, 19 | N |
| makeDeposit | 30 | 200 | 0 | | N |
| getConnection | 130 | 1840 | 20318 | ... | N |
| info | 260 | 776 | 8980 | ... | N |
| ... | | | | | |

FIG. 13

```
    public class OrdinaryDeposit {
        Logger logger;
        public int balanceInquiry(int id) {                                              ⎫
①           int result;                                                                 ⎪
②           logger.info("balanceInquiry(START):id=" + id); // audit log          B2     ⎪
③                                                                                B3     ⎪
            if (id <= 0) {                                                              ⎪
                throw new InvalidParameterException();                                  ⎪
            }                                                                           ⎪
⑥           Connection conn = null;                                              B6     ⎪
            try {                                                                B7     ⎪
                conn = getConnection();                                          B8     ⎪
⑨               PreparedStatement pstmt =                                               ⎬ M1
                    conn.prepareStatement(                                       B9     ⎪
                    "SELECT account_balance   FROM account_tbl                          ⎪
                        WHERE account_id = ?");                                         ⎪
⑩               pstmt.setInt(1, id);                                             B10    ⎪
⑪               ResultSet rs = pstmt.executeQuery();                             B11    ⎪
⑫               result = rs.getInt(1);                                           B12    ⎪
            } catch (SQLException e) {                                                  ⎪
                logger.error(e.getSQLState())                                           ⎪
            } finally {                                                                 ⎪
⑯               if (conn!=null)   conn.close();                                  B16    ⎪
            }                                                                           ⎪
⑱           logger.info(" balanceInquiry(END):id=" + id);                        B18    ⎪
            return result;                                                       B19    ⎪
        }                                                                               ⎭
        public void makeDeposit(int id, int depositAmount) {                            ⎫
            logger.info(" makeDeposit(START):id=" + id); // audit log                   ⎪
            if (id <= 0) {                                                              ⎪
                throw new InvalidParameterException();                                  ⎪
            }                                                                           ⎪
            if (depositAmount <= 0) {                                                   ⎬ M2
                throw new InvalidParameterException();                                  ⎪
            }                                                                           ⎪
            Connection conn = getConnection(); // get DB connection                     ⎪
            try {                                                                       ⎪
                ...                                                                     ⎭
    }
```

| METHOD IDENTIFIER | EXECUTION COUNT | BYTE CODE SIZE | NATIVE CODE SIZE | OPTIMIZED BLOCKS | OPTIMIZATION COMPLETED |
|---|---|---|---|---|---|
| balanceInquiry | 1000 | 80 | 3304 | 2, 3, 6, 7, 8, 9, 10, 11, 12, 16, 18, 19 | Y |
| makeDeposit | 340 | 120 | 2510 | 4, 11, 13, 18, 20 | N |
| getConnection | 1300 | 628 | 45182 | ... | Y |
| info | 2600 | 224 | 16904 | ... | Y |
| ... | | | | | |

METHOD FOR CONTROLLING PROGRAM EXECUTION

CROSS-REFERENCE TO RELATED APPLICATION

This application is based upon and claims the benefit of priority from the prior Japanese Patent Application No. 2013-065039 filed on Mar. 26, 2013, the entire contents of which are incorporated herein by reference.

FIELD

The embodiment discussed herein is related to a method for controlling program execution.

BACKGROUND

As a representative technology for a virtual machine that executes programs without being dependent upon a specific platform, there is a technology that uses the Java (registered trademark) language. To be specific, the Java Virtual Machine (Java VM; program execution control program) that interprets and executes Java byte code is an example of such a technology.

However, byte code has a large overhead and a poor execution time compared to native code that is able to be directly interpreted by a processor. Therefore, for example, dynamic compilation from byte code to native code is performed by a just-in-time (JIT) compiler when a program is executed. Thus, byte code is converted into native code, and the speed of processing is increased (for example, Japanese Laid-open Patent Publication No. 11-237989, and Japanese Laid-open Patent Publication No. 2004-355277).

For example, compilation from byte code to native code in a Java VM is performed when the execution count of a program has exceeded a set value. At such time, the Java VM waits for the completion of compilation, and executes the generated native code when the compilation is completed. Alternatively, for example, in the Java VM, compilation to native code is performed parallel with the execution of processing by byte code. In this case, the Java VM executes byte code until the compilation is completed, and executes native code as soon as the compilation is completed.

SUMMARY

According to an aspect of the invention, there is provided a method for causing a program-execution control program to execute a byte code program by converting at least a portion of the byte code program into a native code. When executing an execution-target program that is a program to be executed via the program-execution control program, a byte code in the execution-target program is converted into a native code, based on a predetermined condition. Upon activating the execution-target program, it is determined whether the execution-target program is an optimization-completed program having a past record of having been converted into an optimized state of the execution-target program, based on a profile that includes identification information identifying the optimization-completed program and optimized-code information indicating an optimized code for the optimization-completed program, where the profile is updated at a program-execution timing of executing the program-execution control program or another program-execution control program, and the optimized code is generated by converting a byte code into a native code. When the execution-target program is the optimization-completed program, upon activating the execution-target program, a byte code corresponding to the optimized-code information indicating the optimized code from among byte codes of the execution-target program is converted into a native code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating an example of the source code of a program written in the Java language;

FIG. 7 is a diagram illustrating an example of code that is converted into native code in the program of FIGS. 6A and 6B;

FIG. 8 is a diagram illustrating an example of a program profile corresponding to the program of FIG. 7, according to an embodiment;

FIG. 13 is a diagram illustrating an example of the program of FIG. 7 for which native code conversion has been further advanced through the execution control processing, according to an embodiment;

FIG. 14 is a diagram illustrating an example of a program profile corresponding to the program of FIG. 13, according to an embodiment;

DESCRIPTION OF EMBODIMENT

However, in the Java VM, the overhead for compilation to native code is significant. For example, in financial and insurance/securities online systems, from the first time of executing a program, an execution speed (overhead) is preferable that is equivalent to that of programs in languages such as C, C++, and COBOL with which programs are provided in native code.

Furthermore, although the native code of a program is optimized by the program being repeatedly executed, this is effective only while a compiled Java VM process is running. Therefore, a Java VM process is unable to share native code with another Java VM process. Consequently, compilation processing from byte code to native code is performed in each Java VM.

Hereinafter, embodiments will be described in accordance with the drawings. However, the technical scope of the present disclosure is not restricted to the embodiments, and extends to the items disclosed in the claims and to items equivalent thereto.

[Configuration Diagram of a Program Execution Control Device]

Figure 19:
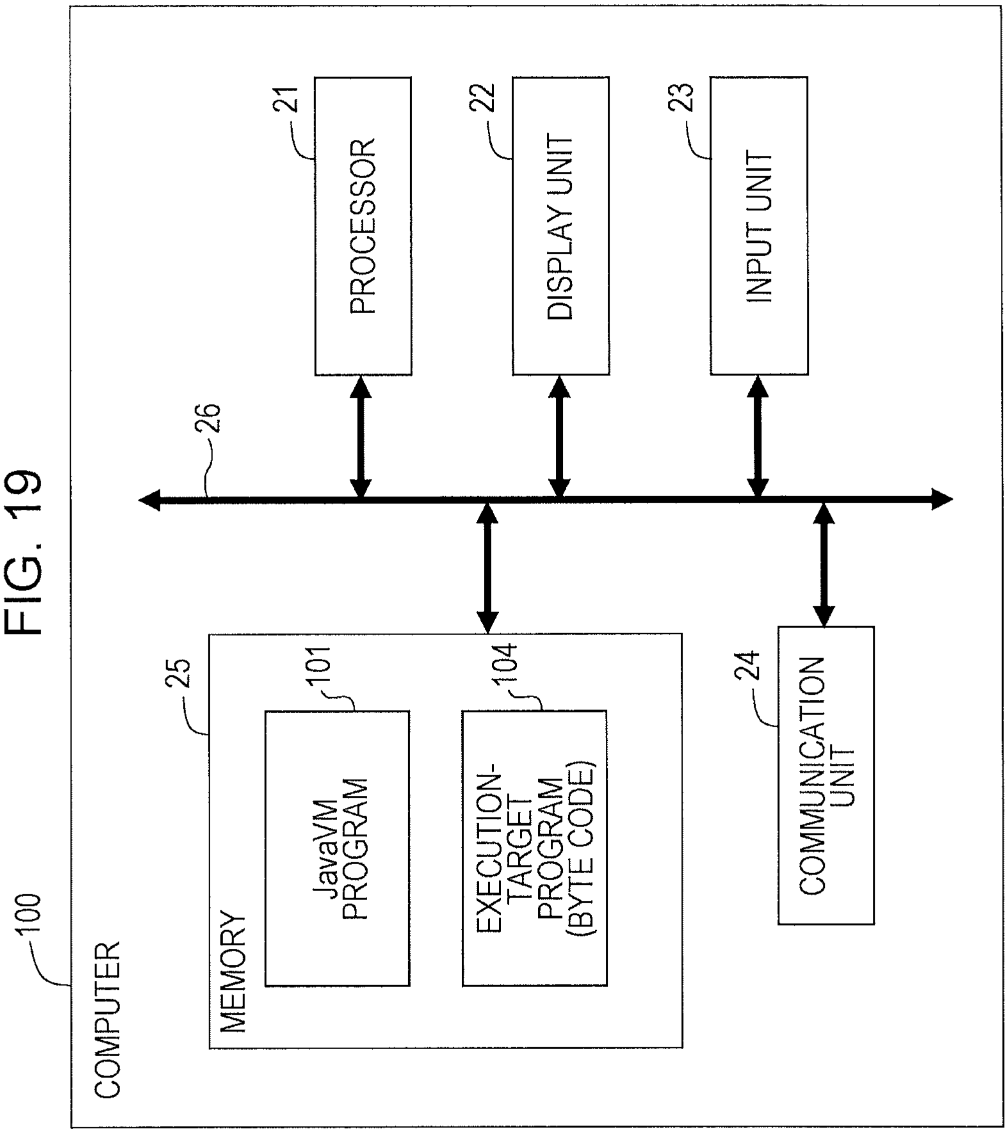
FIG. 19 is a diagram illustrating an example of a configuration of a device in which a program execution control program runs, according to an embodiment.

FIG. 19 is a diagram illustrating an example of the configuration of a device 100 in which the program execution control program of the embodiment runs. The execution control device 100 of FIG. 19 is a general computer for example, and includes a processor 21, a display unit 22, an input unit 23, a communication unit 24, and a memory 25. These units are connected to each other via a bus 26.

In FIG. 19, the display unit 22 represents, for example, a computer liquid crystal monitor or the like, and the input unit 23 represents a keyboard and a mouse or the like. The communication unit 24 controls communication processing with other computers. Furthermore, in the example of FIG. 19, the program execution control program 101 of the embodiment and byte code 104, which is an execution-target program, are stored in the memory 25, such as a random access memory (RAM). The byte code 104 will be described later. The program execution control program 101 is a Java VM. Hereinafter, the program execution control program 101 is referred to as a Java VM. The processor 21 cooperates with the Java VM program 101 and implements the program execution control processing of the embodiment.

[Block Diagram of a Program Execution Control Device]

Figure 1:
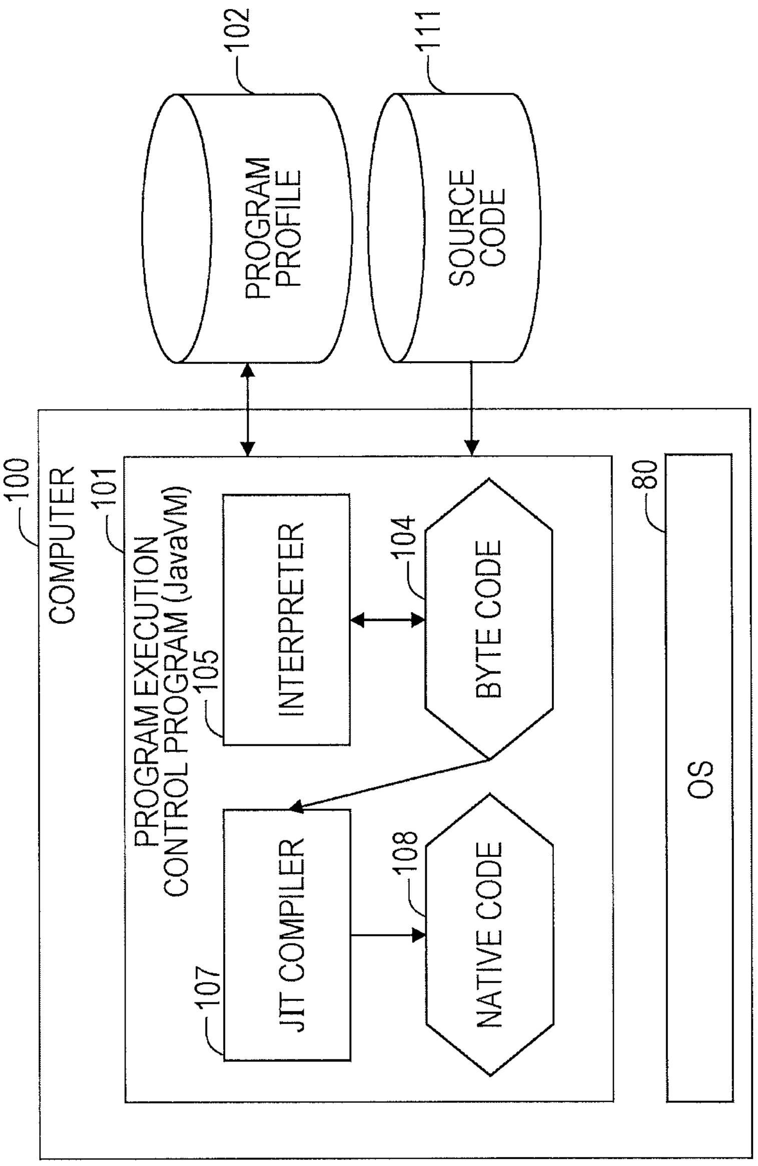
FIG. 1 is a diagram illustrating an example of a block diagram of the program execution control device 100 of the embodiment.

FIG. 1 is a diagram illustrating an example of a block diagram of the program execution control device 100 of the embodiment. The Java VM 101 is executed under control of an OS 80 that runs on the computer 100.

The Java VM 101 of FIG. 1 includes, for example, an interpreter 105 and a JIT compiler 107. The interpreter 105 sequentially interprets and executes the byte code 104, which represents a Java-language program. Furthermore, the JIT compiler 107 compiles and converts (dynamic compilation) the byte code 104 into native code 108. Furthermore, in the embodiment, the Java VM 101 refers to and updates a program profile 102 in which information on conversion of the byte code 104 into the native code 108 is stored. The program profile 102 is stored, for example, on storage media that the computer 100 is able to access.

The byte code 104 and the native code 108 will now be described.

[Byte Code and Native Code]

The byte code 104 is generated by source code 111 written in the Java language being converted. The byte code 104 is an executable program and is written by a set of instructions defined without being dependent upon a specific OS 80 or hardware. That is, as long as the environment is one in which the Java VM 101 runs, the byte code 104 is able to be executed by a variety of OSs 80 and hardware, and performs the same processing without being dependent upon the OS 80 or the hardware.

Furthermore, the native code 108 is generated by the byte code 104 being compiled by the JIT compiler 107. The native code 108 is code written in a machine language that is able to be executed by the OS 80, and is dependent upon a specific OS 80 and hardware. Furthermore, the native code 108 is generated in the memory of a Java VM 101 process that has performed compilation. Therefore, the native code 108 is lost when the Java VM 101 process ends.

Figure 2A:
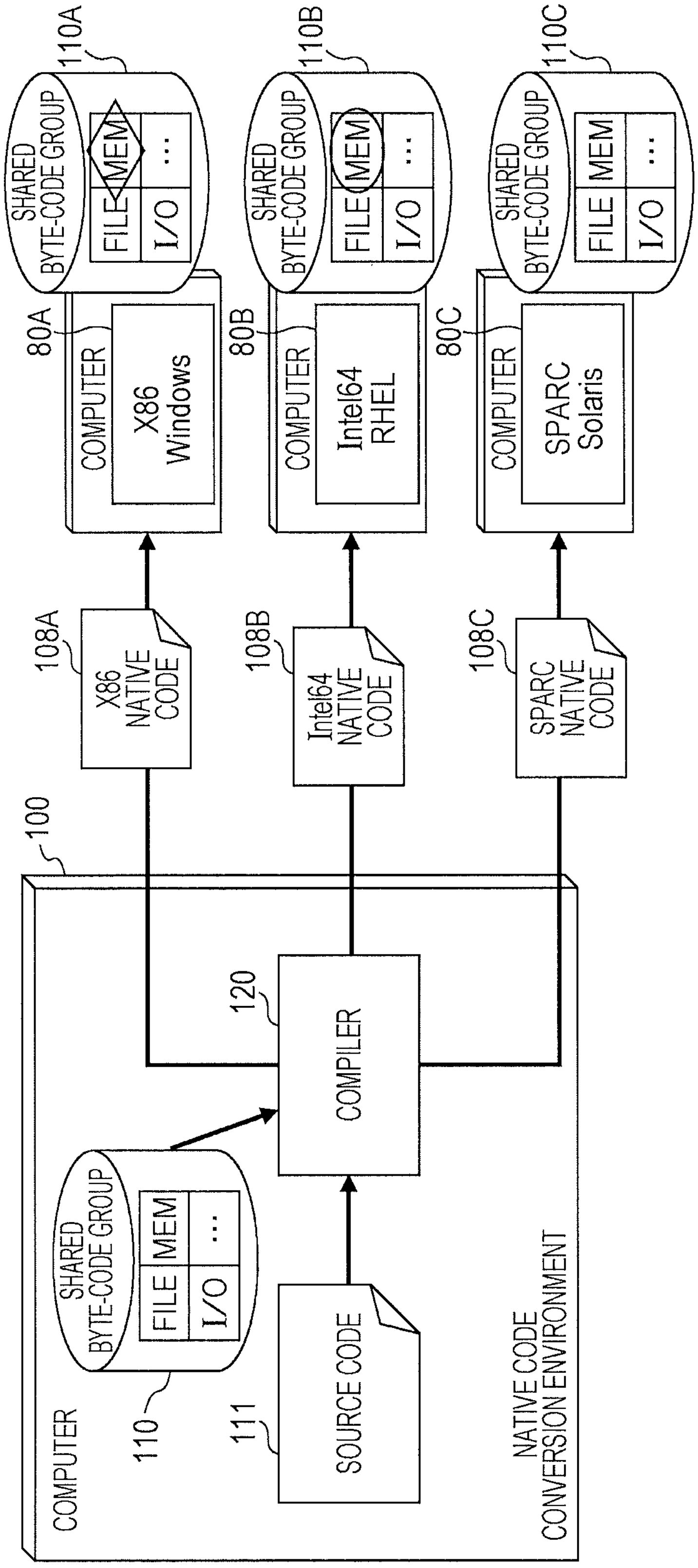
FIGS. 2A and 2B are diagrams each illustrating native code and byte code.
Figure 2B:
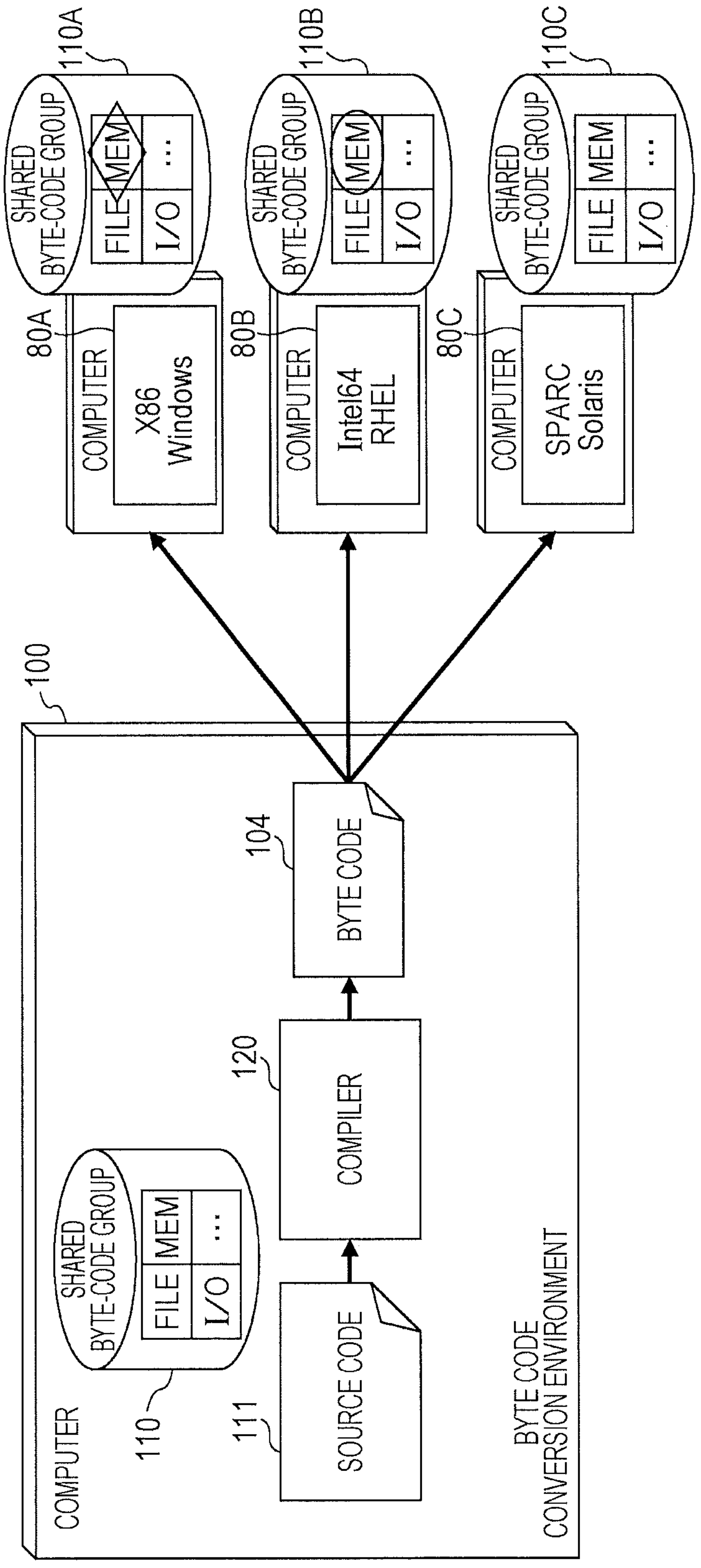

FIGS. 2A and 2B are diagrams each illustrating the native code 108 and the byte code 104. FIG. 2A is a diagram illustrating an example where native code 108A, 108B, and 108C generated in association with a plurality of different types of OSs 80A, 80B, and 80C, respectively, are distributed to the corresponding OSs. Furthermore, FIG. 2B is a diagram illustrating an example where common byte code 104 is distributed to the plurality of different types of OSs 80A, 80B, and 80C. In these examples, the plurality of different types of OSs 80A, 80B, and 80C are, for example, x86 Windows (registered trademark) 80A, Intel 64 Red Hat Enterprise Linux (registered trademark) 80B, and SPARC Solaris (registered trademark) 80C.

In FIG. 2A, the native code 108A, 108B, and 108C are generated by the same source code 111 being converted dependent upon the OSs 80A, 80B, and 80C, and are distributed to the corresponding OSs. The native code 108A, 108B, and 108C are generated by all of the code within the source code 111 being compiled corresponding to the OSs that are the platforms for the execution environments. That is, full compilation processing that is dependent upon the platform in question is performed for each type of platform, and native code is generated. Therefore, native code 108 generated for a specific OS does not run on a different OS. Therefore, in the example of FIG. 2A, native code 108A for x86 Windows, native code 108B for Intel 64 Red Hat Enterprise Linux, and native code 108C for SPARC Solaris are generated.

Furthermore, in FIG. 2A, all of the code within the source code 111 is converted. Therefore, code having a low execution frequency from among the code of the source code 111 is also compiled. In other words, code within the source code 111 is uniformly converted into native code regardless of the execution frequency thereof. Consequently, code for which there is little merit in being converted into native code, and code that is not desired to be converted into native code may be compiled, which is not efficient. In this way, in the case where the native code 108A, 108B, and 108C generated in association with the OSs are distributed, full compilation processing of the source code 111 is performed for each type of OS, and furthermore the native code 108A, 108B, and 108C does not run on different OSs. Moreover, the native code 108 includes a shared byte-code group 110 that is called from within a program. The shared byte-code group 110 is, for example, a common library (file I/O methods, security methods, and the like) and common declarations and the like.

On the other hand, in FIG. 2B, the same byte code 104 is distributed to each of the OSs 80A, 80B, and 80C. The byte code 104 implements the same processing in all of the OSs as long as the OSs have Java VMs 101 running thereon. However, since the byte code 104 is sequentially interpreted and executed, the execution speed is slower than the execution speed of processing based on the native code 108A, 108B, and 108C. Moreover, the byte code 104 does not include the shared byte-code group 110. Therefore, the shared byte-code groups 110A, 110B, and 110C of the Java VMs 101 are used at the time of executing the byte code 104.

Next, a more detailed block diagram of the Java VM 101 of the embodiment is described.

[Java VM Block Diagram]

Figure 3:
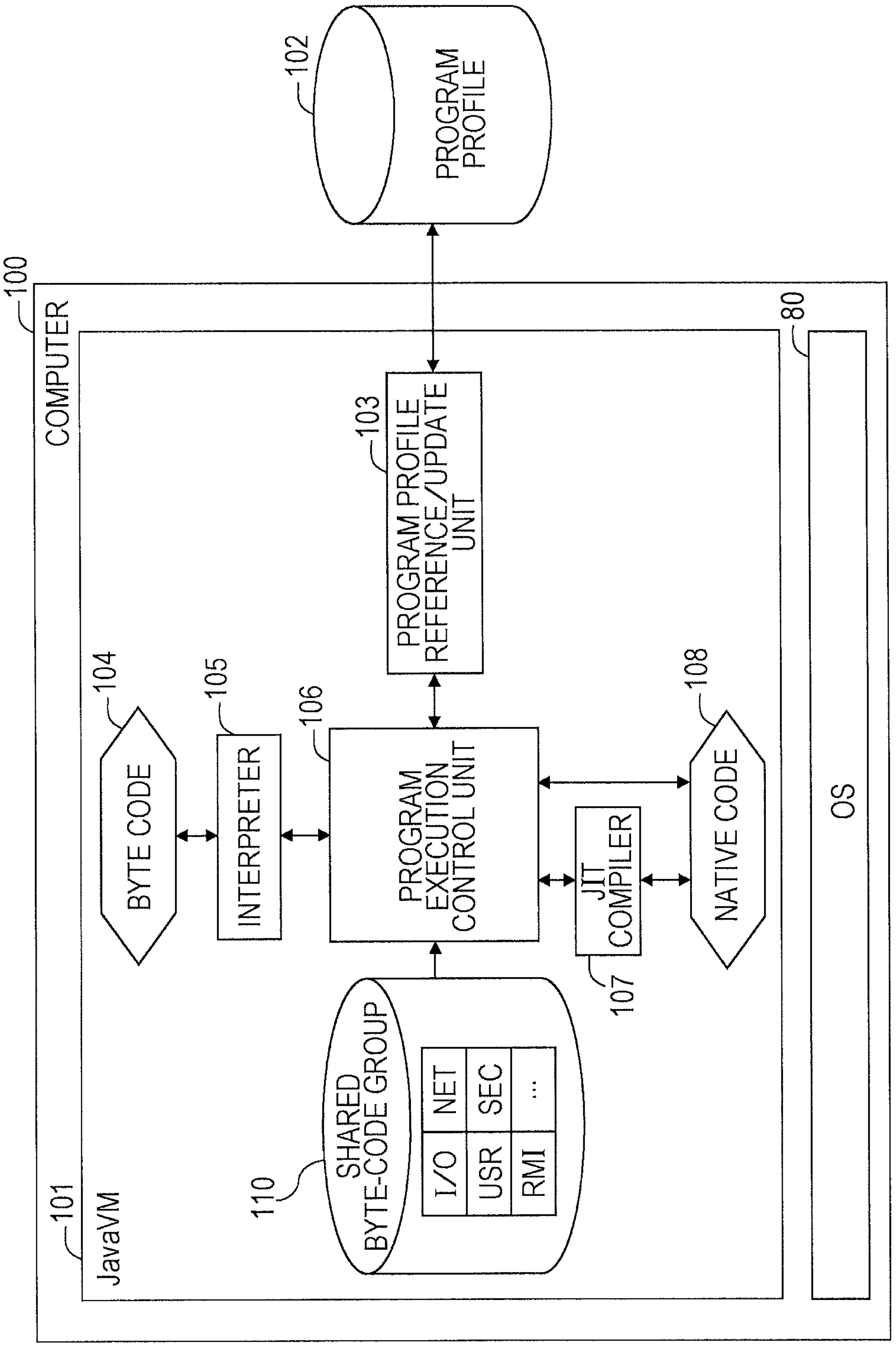
FIG. 3 is an exemplary diagram illustrating the details of a block diagram of a Java VM, according to an embodiment.

FIG. 3 is an exemplary diagram illustrating the details of a block diagram of a Java VM 101, according to an embodiment. The Java VM 101 of FIG. 3 has, in addition to the interpreter 105 and the JIT compiler 107 depicted in FIG. 1, a program execution control unit 106, a shared byte-code group 110, and a program profile reference/update unit 103. The program execution control unit 106 performs control relating to the execution of a program, issues compilation instructions for the JIT compiler 107, and issues instructions and the like for the program profile reference/update unit 103. The shared byte-code group 110 is a common library and includes common declarations and the like, and is written in byte code. The program profile reference/update unit 103 performs reference processing and update processing for the program profile 102 on the basis of the instructions of the program execution control unit 106.

In FIG. 3, the interpreter 105 of the Java VM 101 sequentially interprets the byte code 104, and causes the byte code 104 to be executed by the program execution control unit 106. Furthermore, the program execution control unit 106 detects, on the basis of a predetermined condition, code that it would be effective to compile into native code from among byte code, and converts the detected code into native code 108 by the JIT compiler 107. For example, the JIT compiler 107 converts code that is executed a standard number of times or more, into native code. The standard number of times may be once or a plurality of times. For example, the JIT compiler 107 may convert code having a high execution frequency into native code 108. When a program is repeatedly executed, optimization of the program advances due to the conversion of byte code into native code by the JIT compiler 107 being repeatedly performed. As a result of the optimization, a program is generated in which code that it would be effective to convert into native code is converted into native code from among the byte code of the program.

Furthermore, in FIG. 3, the program execution control unit 106 refers to and updates the program profile 102 by way of the program profile reference/update unit 103. When the Java VM 101 is activated, the program execution control unit 106 of the embodiment refers to the program profile 102, and determines whether or not the execution-target program has a past record of having been converted into an optimized state. When the execution-target program has a past record of having been converted into an optimized state, the program execution control unit 106, at the time of activation, converts the execution-target program in advance into an optimized state by the JIT compiler 107. The details are described later.

Next, an overview of the processing of a program in a general Java VM and the Java VM of the embodiment is described.

[Overview of the Processing of a General Java VM]

Figure 4:
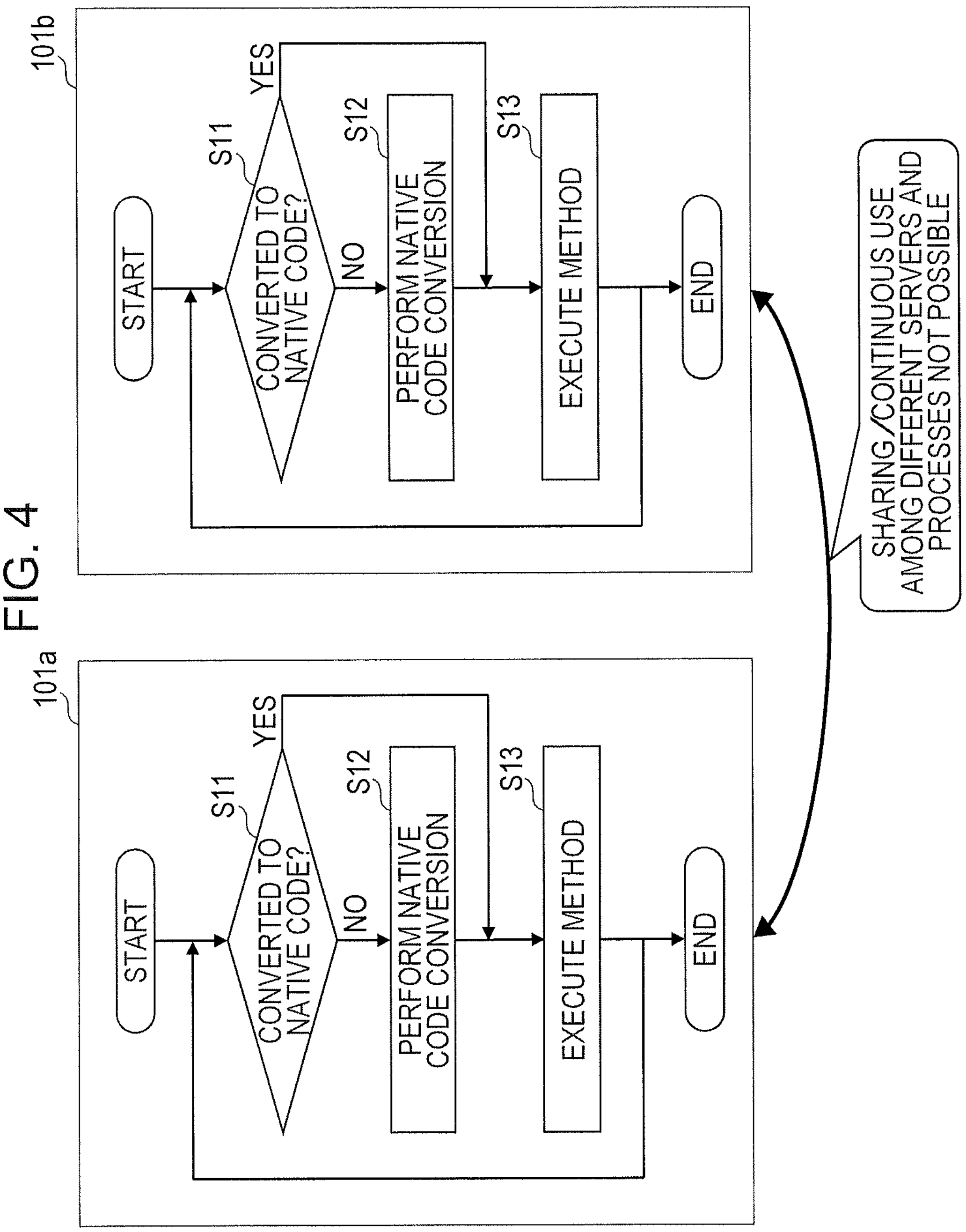
FIG. 4 is a diagram illustrating an overview of the processing of a general Java VM.

FIG. 4 is a diagram illustrating an overview of the processing of program in general Java VMs 101*a* and 101*b*. In this example, the Java VMs 101*a* and 101*b* convert byte code 104 that is executed one or more times for example, into native code 108. Furthermore, FIG. 4 exemplifies the case where the processes of the two Java VMs 101*a* and 101*b* run on a common OS 80. Furthermore, execution-target programs are hereinafter referred to as methods.

In the flowchart diagram of FIG. 4, first, the Java VM 101*a* determines whether or not execution-target code in an execution-target method has been converted into native code (S11). When the execution-target code has not been converted into native code (NO in S11), the Java VM 101*a* converts the byte code 104 into native code 108 (S12). Next, the method is executed on the basis of the generated native code 108 (S13). The same processing is executed in the other Java VM 101*b*.

The native code 108 is generated in the memory of each of the Java VMs 101*a* and 101*b*. Therefore, the native code 108 generated by the Java VMs and information on the code converted into native code are not shared between the plurality of Java VMs 101*a* and 101*b*. Furthermore, the native code 108 generated by the Java VMs 101*a* and 101*b* is not retained as a result of reactivation of the Java VMs 101*a* and 101*b*.

[Overview of the Processing of the Java VM of the Embodiment]

Figure 5:
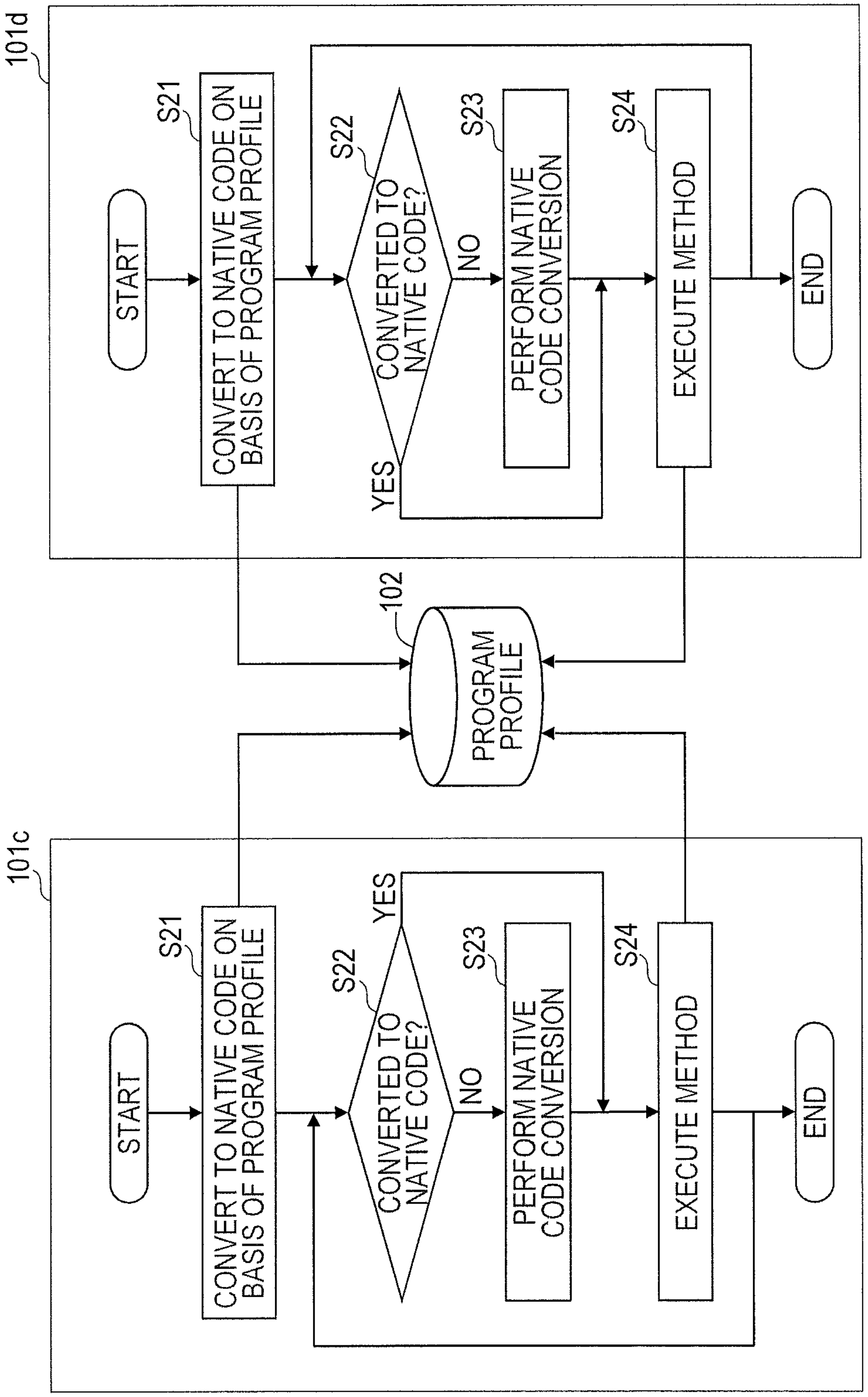
FIG. 5 is a diagram illustrating an overview of the processing in the Java VM, according to an embodiment.

FIG. 5 is a diagram illustrating an overview of the processing of a program in Java VMs 101*c* and 101*d* of the embodiment. As in the example of FIG. 4, Java VMs 101*c* and 101*d* convert byte code 104 that is executed one or more times, into native code 108. Furthermore, this example exemplifies the case where the processes of the two Java VMs 101*c* and 101*d* are run on a common OS 80.

In the flowchart diagram of FIG. 5, the Java VM 101*c* of the embodiment performs native code conversion for an execution-target method on the basis of the program profile 102 when the Java VM 101*c* itself is activated (S21). The program profile 102 of the embodiment includes identification information of a method that has a past record of having been converted into an optimized state, and information on optimized code that has been converted into native code 108 from among the code of the method in question. To be specific, when the program profile 102 includes, with respect to the execution-target method, a past record of having been converted into an optimized state, the Java VM 101*c* converts the method into an optimized state in advance on the basis of the information on the optimized code in the program profile 102.

Next, the Java VM 101*c* determines whether or not execution-target code in the method has been converted into native code (S22). When the execution-target code has not been converted into native code (NO in S22), the Java VM 101*c* converts the byte code 104 into native code 108 (S23). There are cases where the execution-target code in a method differs due to parameters at the time of execution and the execution environment. Therefore, native code conversion processing occurs even with methods that have been converted into an optimized state. Next, the method is executed on the basis of the native code 108 (S24). At this time, code information that has been newly converted into native code, and information as to whether or not the method has been converted into an optimized state and the like are updated in the program profile 102. The other Java VM 101*d* performs the same processing for referring to and updating the program profile 102 that is shared with the Java VM 101*c*.

In this way, the Java VMs 101*c* and 101*d* of the embodiment, at the time of activation, convert execution-target methods into an optimized state in advance on the basis of the program profile 102. Thus, the Java VMs 101*c* and 101*d* are able to improve the processing speed of a method from the first time the method is executed. Furthermore, in the embodiment, the program profile 102 is shared by the plurality of Java VMs 101*c* and 101*d*. Thus, the Java VM 101*c*, at the time of activation, is able to convert an execution-target method into an optimized state on the basis of the program profile 102 generated at the time of executing the other Java VM 101*d*. Furthermore, for example, in the case where the Java VM 101*c* is reactivated, the Java VM 101*c* is able to continuously use the program profile 102 of the previous time of execution.

A more detailed description of the content of the processing performed by the Java VMs 101*c* and 101*d* of the embodiment is given later. Here, an example of the program profile 102 is described. Furthermore, prior to describing an example of the program profile 102, an example of a method corresponding to the program profile 102, and an example of code that is converted into native code in the method in question are described.

[Specific Example of a Program]

FIGS. 6A and 6B are diagrams illustrating an example of the source code 111 of a program written in the Java language. When the source code 111 of FIGS. 6A and 6B is converted, byte code 104 is generated. For example, a balanceInquiry method (function) M1 and a makeDeposit method (function) M2 of an OrdinaryDeposit class are written in the source code 111 of FIGS. 6A and 6B. The balanceInquiry method M1 is a method that inputs an id parameter, and inquires about the balance of the ordinary account indicated by the id parameter. Furthermore, the makeDeposit method M2 is a method that inputs the id parameter and a depositAmount parameter, and makes a deposit of the amount of money indicated by the depositAmount parameter into the ordinary account indicated by the id parameter.

As in the source code 111 of FIGS. 6A and 6B, the program generally has branch instructions such as if statements and try statements. Therefore, the execution-target code is converted on the basis of the determination results of the branch instructions. Furthermore, the program has instructions such as for statements. Therefore, depending on the code, execution is performed a plurality of times by way of a method being executed once. On the other hand, code for which exception handling is written has a low execution frequency because such code is less likely to be executed. In this way, the execution frequency of code is different even with code within the same method. Therefore, for example, in the case where code that is executed a plurality of times is to be converted into native code, even with code within the same method, there is code that is converted into native code and there is code that remains as byte code and is not converted.

[Example of the Native Code Conversion of a Program]

FIG. 7 is a diagram illustrating an example of code that is converted into native code in the program of FIGS. 6A and 6B. In FIG. 7, block conversion is performed for the code enclosed by the dashed lines, and numbers are given to the code blocks. Code within the code blocks enclosed by the thick lines in FIG. 7 is code that is to be converted into native code by the JIT compiler 107. In this example, in the code in the method M1, the code corresponding to blocks B2 and B3, blocks B6 to B8, block B16, and blocks B18 and B19 is to be converted into native code.

[Example of a Program Profile]

FIG. 8 is a diagram depicting an example of a program profile 102-1 corresponding to the program of FIG. 7. The program profile 102-1 of FIG. 8 includes, for example, a method identifier, an execution count, a byte code size, a native code size, information on optimized blocks, and an optimization completion flag.

The method identifier is information with which a method is able to be specified, and indicates a method name for example. Furthermore, the execution count indicates the number of times a method has been executed subsequent to a Java VM 101 being activated. The byte code size indicates the size (bytes) of the byte code in the code of a method, and the native code size indicates the size (bytes) of the native code in the code of a method. The information on optimized blocks indicates the numbers of the code blocks that have been converted into native code. The optimization completion flag indicates whether or not the method has been converted up to the optimized state.

The program profile 102-1 of FIG. 8 includes information indicating that the balanceInquiry method M1 has been executed 100 times subsequent to the Java VM 101 being activated. Furthermore, the program profile 102-1 includes information indicating that, with respect to the balanceInquiry method M1, the byte code size is 80 bytes and the native code size is 1,324 bytes, and an optimization completion flag N indicating non-conversion to an optimized state. Furthermore, the program profile 102-1 includes, as information on optimized blocks, the numbers 2, 3, 6, 7, 8, 16, 18, and 19 of the code blocks (FIG. 7) that have been converted into native code.

In this way, the program profile 102-1 includes, with respect to methods that have past records of having been executed, method identification information, an optimization completion flag indicating whether or not the method in question has been converted into an optimized state, and information on the optimized blocks (information on optimized code) that have been converted into native code. Optimization processing is performed on the basis of this kind of program profile 102-1 when a Java VM 101 is activated.

Next, the details of the processing performed by the Java VM 101 of the embodiment are described in sequence on the basis of a flowchart diagram.

[Flowchart Depicting all Processing]

Figure 9:
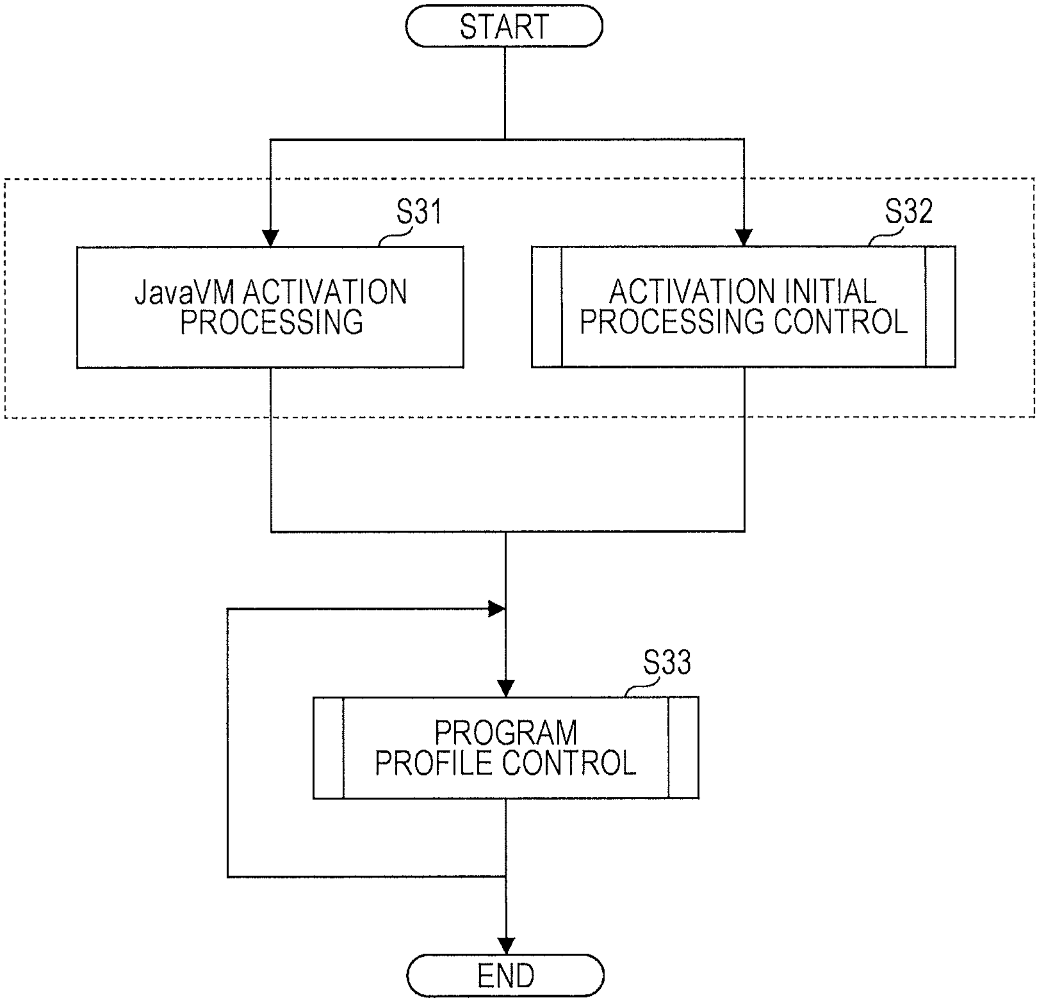
FIG. 9 is a diagram illustrating an example of an operational flowchart for a Java VM, according to an embodiment.

FIG. 9 is a diagram illustrating an example of an operational flowchart for a Java VM, according to an embodiment. The program execution control unit 106 of a Java VM 101, at the time of activation, performs activation processing for the Java VM 101 (S31), and also performs activation initial processing control (S32). To be specific, as the activation initial processing control, the Java VM 101 performs conversion to an optimized state for an execution-target method on the basis of the program profile 102. The details of the activation initial processing control will be described later on the basis of another flowchart diagram. Next, the program execution control unit 106 performs program profile control (S33). As the program profile control, the program execution control unit 106 executes the execution-target method, and also updates the program profile 102 on the basis of the information of the method after execution. The details of the program profile control will be also described later on the basis of another flowchart diagram.

[Flowchart for Activation Initial Processing Control]

Figure 10:
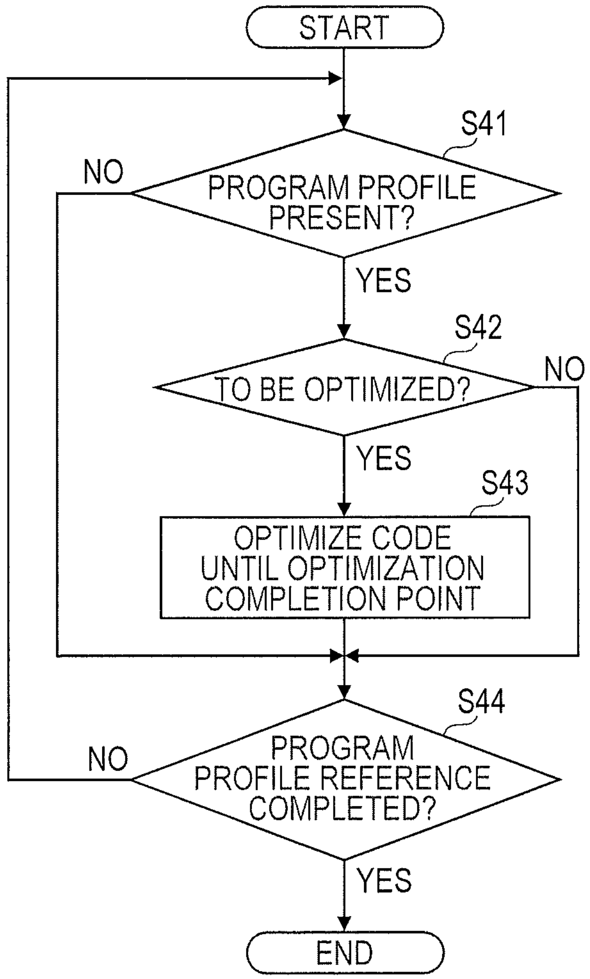
FIG. 10 is a diagram illustrating an example of an operational flowchart for activation initial processing control, according to an embodiment.

FIG. 10 is a diagram illustrating an example of an operational flowchart for activation initial processing control, according to an embodiment. This operational flowchart corresponds to the processing of operation S32 in the operational flowchart of FIG. 9.

First, the program execution control unit 106 determines whether or not a program profile 102 is present (S41). When a program profile 102 is present (YES in S41), next, the program execution control unit 106 refers to the program profile 102 and determines whether or not the execution-target method is to be optimized (S42). To be specific, the program execution control unit 106 optimizes the execution-target method when the optimization completion flag denotes Y in the program profile 102 with respect to the execution-target method. The optimization completion flag denoting Y indicates that, at the time of executing the same or another Java VM 101, the execution-target method has a past record of having been converted into an optimized state. The time of executing the same or another Java VM 101 refers to, for example, the time of executing another Java VM 101 that runs on the same OS, the time of executing a Java VM 101 that runs on another OS, the previous time of executing a Java VM 101, and so on.

When the optimization completion flag of the execution-target method denotes Y (YES in S42), the JIT compiler 107 of the Java VM 101 converts the execution-target method into an optimized state on the basis of the information on optimized blocks in the program profile 102. To be specific, the Java VM 101 converts, into native code, the byte code corresponding to the information on optimized blocks (information on optimized code) from among the byte code of the execution-target method.

However, when a program profile 102 is not present (NO in S41), or when the optimization completion flag of the execution-target method denotes N (NO in S42), conversion processing for the execution-target method when the Java VM 101 is activated is not performed. When the program profile 102 has been completely referenced, the program execution control unit 106 ends the activation initial processing control (S32 of FIG. 9).

[Operational Flowchart for Program Profile Control]

Figure 11:
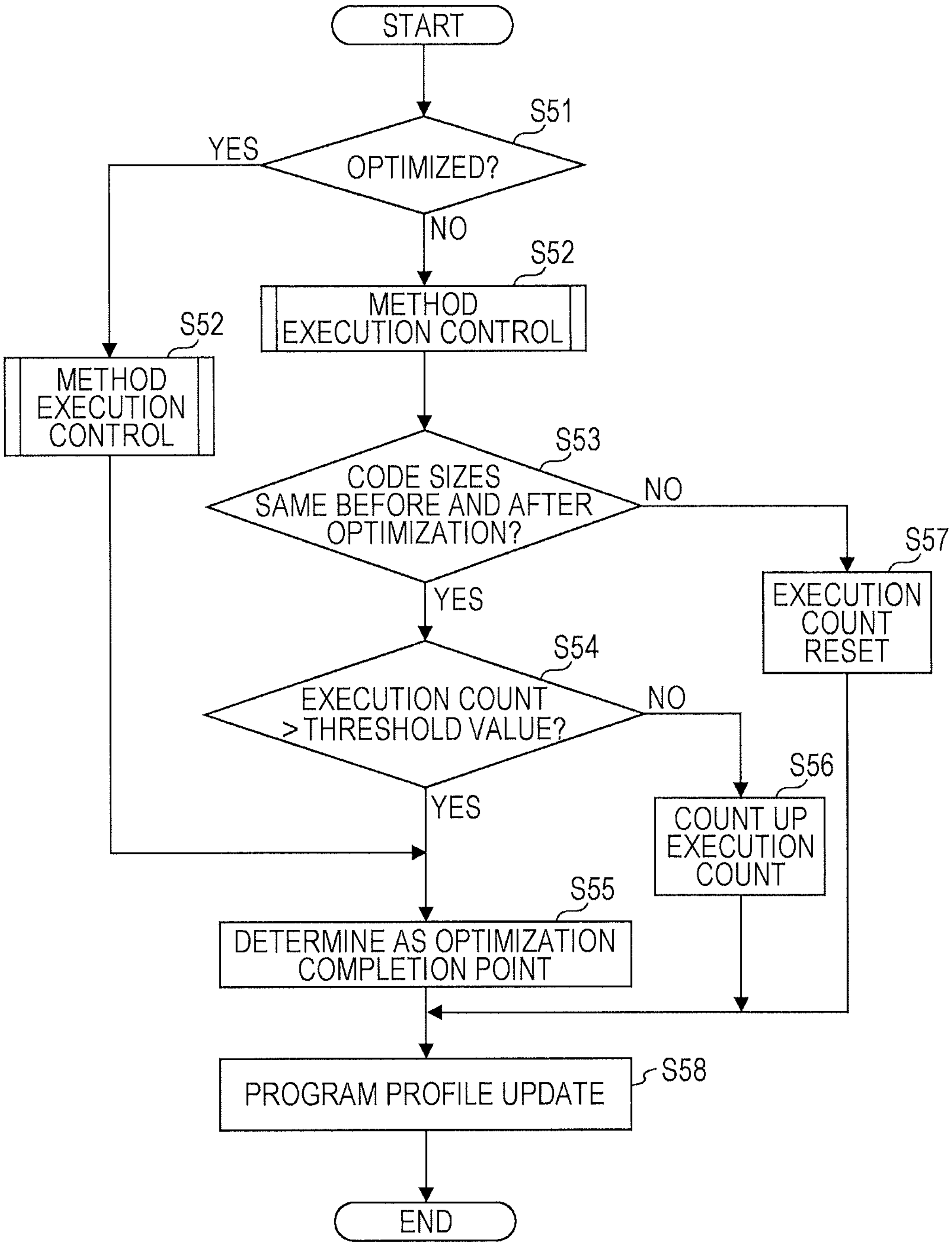
FIG. 11 is a diagram illustrating an example of an operational flowchart for program profile control, according to an embodiment.

FIG. 11 is a diagram illustrating an example of an operational flowchart for program profile control, according to an embodiment. This operational flowchart corresponds to the processing of operation S33 in the operational flowchart of FIG. 9. Subsequent to activation, the program execution control unit 106 determines on the basis of the program profile 102 whether or not the execution-target method has been converted into an optimized state (S51). When the execution-target method has not been converted into an optimized state (NO in S51), next, the program execution control unit 106 performs execution control processing for the execution-target method (S52). The execution control processing will be described later in another flowchart diagram.

Next, after performing the execution control processing, the program execution control unit 106 refers to the program profile 102, and determines whether or not the code sizes of the method are the same before and after the execution control processing (S53). To be specific, the program execution control unit 106 determines, with respect to a method, whether or not the code sizes (byte code size and native code size) in the program profile 102 are the same as the code sizes after the execution control processing. When they are the same (YES in S53), the program execution control unit 106 determines whether or not the execution count that is counted up in the case where the code sizes of the method are the same has exceeded a threshold value (standard execution count) (S54).

When the threshold value has been exceeded (YES in S54), the program execution control unit 106 deems that the method has been converted into an optimized state, and determines that the method has reached an optimization completion state (S55). To be specific, in the case where there is no change in the code sizes of the method before and after performing the method execution control processing by the standard execution count stipulated by the threshold value, the program execution control unit 106 deems that the method has been converted into an optimized state, and that the optimization completion point has been reached. That is, code within the method is sequentially converted into native code by the method being repeatedly executed, and when there is no longer any code to be newly converted into native code, changes in the code sizes of the method converge, and it is deemed that the method has been converted into an optimized state.

On the other hand, when the code sizes of the method are the same before and after the execution control processing (YES in S53), but the execution count has not exceeded the threshold value (NO in S54), the program execution control unit 106 counts up the execution count (S56). Furthermore, when the code sizes of the method before and after the execution control processing are different (NO in S53), the program execution control unit 106 resets the execution count (S57). Furthermore, when the Java VM 101 is activated, execution control processing for the execution-target method is performed (S52) also in the case where the execution-target method has been converted into an optimized state on the basis of the program profile 102 (YES in S51). Furthermore, at this time, it is deemed that the optimization completion point has been reached (S55).

Next, the program execution control unit 106 updates the program profile 102 (S58). To be specific, the program execution control unit 106 updates the method execution count, the byte code size, the native code size, the information on optimized blocks, and the optimization completion flag in the program profile 102. Moreover, when the method has been converted into an optimized state (YES in S54), the optimization completion flag is updated from N to Y. Furthermore, when the method is not registered in the program profile 102, the program execution control unit 106 newly registers the information of the method in the program profile 102.

[Operational Flowchart for the Execution Control Processing]

Figure 12:
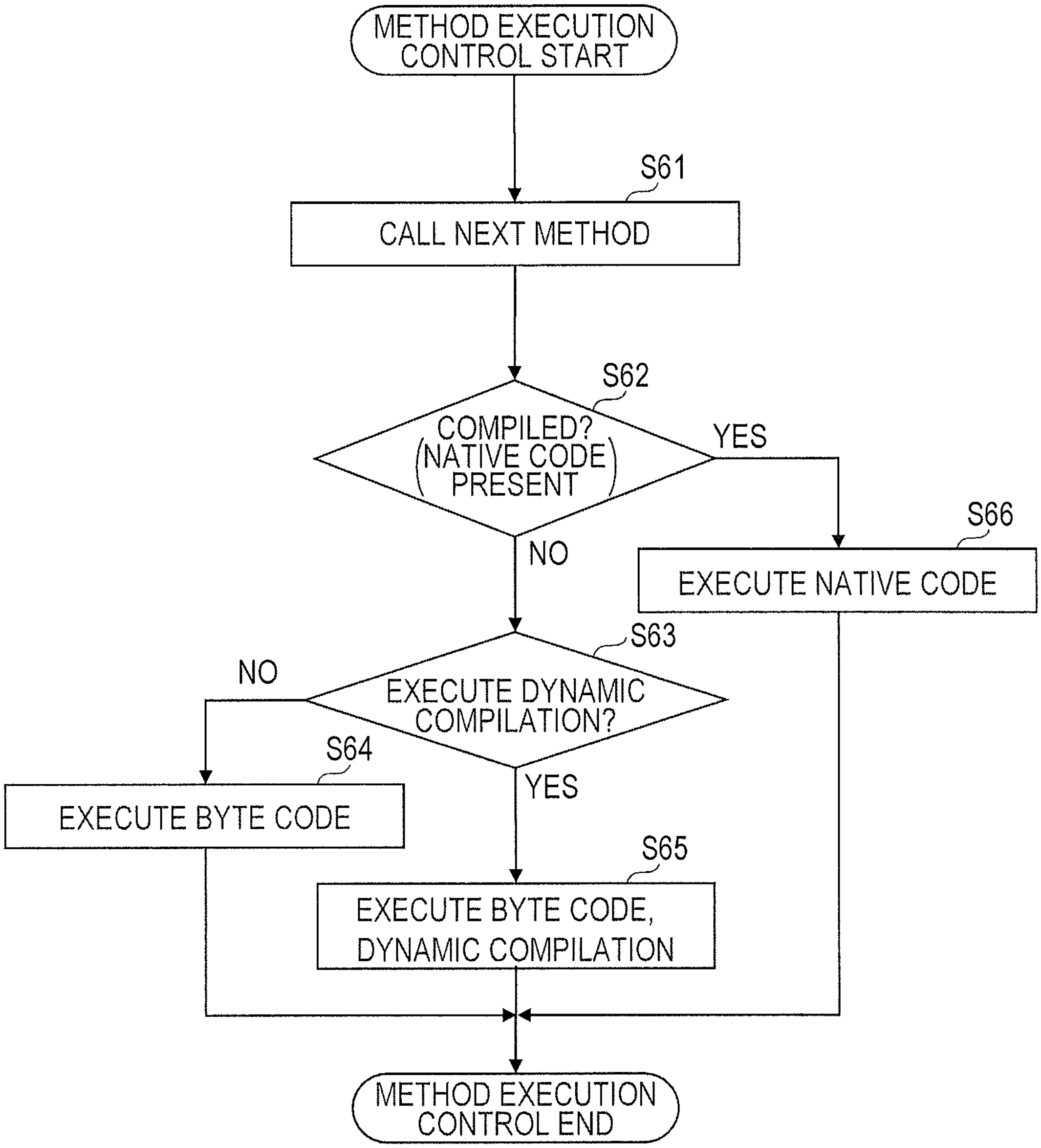
FIG. 12 is a diagram illustrating an example of an operational flowchart for execution control processing, according to an embodiment.

FIG. 12 is a diagram illustrating an example of an operational flowchart for execution control processing, according to an embodiment. This operational flowchart corresponds to operation S52 in the operational flowchart of FIG. 11.

First, the program execution control unit 106 calls the next execution-target method (S61). Next, the program execution control unit 106 determines whether or not the execution-target code within the method has been compiled or converted into native code (S62). When the execution-target code has not been converted into native code (NO in S62) and is to be dynamically compiled (YES in S63), the program execution control unit 106 causes the target byte code to be processed by the interpreter 105 and executed, and to be dynamically compiled by the JIT compiler 107 (S65). Moreover, the case where the execution-target code is to be compiled (YES in S63) is, for example, the case where the execution count of the execution-target code has exceeded a standard number of times.

On the other hand, when the execution-target code has not been converted into native code (NO in S62), and is not to be dynamically compiled (NO in S63), the program execution control unit 106 causes the byte code to be processed by the interpreter 105 and executed (S64). Furthermore, when the execution-target code has already been converted into native code (YES in S62), the program execution control unit 106 executes the native code (S66).

Next, an example of the native code conversion of a program for which conversion processing to native code has been additionally performed through the execution control processing, and an example of updating the program profile 102 are given.

[Example of the Native Code Conversion of a Program]

FIG. 13 is a diagram depicting an example of the program of FIG. 7 for which native code conversion has been further advanced through the execution control processing. In FIG. 13, the code blocks enclosed by the dotted lines represent code blocks that have been newly converted into native code. To be specific, in this example, in addition to blocks B2 and B3, blocks B6 to B8, block B16, and blocks B18 and B19, the code corresponding to blocks B9 to B12 has been newly converted into native code. In this way, the state of conversion into native code changes due to the method being repeatedly executed.

[Example of a Program Profile]

FIG. 14 is a diagram depicting the example of a program profile 102-2 that has been updated in accordance with the method of FIG. 13. For the program profile 102-2 of FIG. 14, updating is performed with respect to the program profile 102-1 of FIG. 8 in accordance with the execution of the methods.

To be specific, for the program profile 102-2 of FIG. 14, the block numbers 9 to 12 have been added to the information on optimized blocks for the balanceInquiry method M1 with respect to the program profile 102-1 of FIG. 8. Furthermore, the execution count has been updated to 1,000 times, the byte code size has been updated to 80 bytes, the native code size has been updated to 3,304 bytes, and the optimization completion flag has been updated from N to Y. This indicates that the code sizes of the balanceInquiry method M1 have converged, and that it has been deemed that conversion has been performed into an optimized state. Furthermore, with respect to the program profile 102-1 of FIG. 8, the execution count has been updated to 340 times and the native code size has been updated from 0 bytes to 2,510 bytes for the makeDeposit method M2. Moreover, the optimization completion flag remains as N and has not been updated for the makeDeposit method M2. Other methods are also similarly updated.

In this way, according to the Java VM 101 of the embodiment, as a result of methods being executed, the information of methods having a past record of having been converted into an optimized state, and the information on the optimized blocks (information on optimized code) of the method in question are stored in the program profile 102-2. In other words, according to the Java VM 101 of the embodiment, as a result of the repeated execution of methods, a program profile 102 including identification information of methods that have a past record of having been converted into an optimized state and including information on optimized code is automatically generated.

The Java VM 101 of the embodiment, at the time of the activation of the Java VM 101, refers to the program profile 102 and is thereby able to convert, into an optimized state in advance, an execution-target method from among execution-target methods that has a past record of having been converted into an optimized state. Thus, the Java VM 101 of the embodiment is able to convert an execution-target method into an optimized state prior to the method being executed, rather than the method being gradually converted as a result of being repeatedly executed. Thus, the overhead at the time of executing a method is minimized, and the speed of processing is increased from the first time of execution.

Furthermore, in the case where all of the code in an execution-target method is to be converted into native code when a Java VM is activated, code for which there is little merit in being converted into native code, and code that is not desired to be converted into native code are also converted, which is time consuming. In contrast to this, the Java VM of the embodiment, at the time of activation, performs conversion into native code for code that it would be effective to convert into native code, rather than for all of the code in an execution-target method. For example, code having a high execution frequency from among the code in a method is converted into native code. Thus, the conversion processing to native code at the time of activation is minimized, and the activation time is reduced. Furthermore, since processing capabilities have greatly improved in recent years with respect to processors and external storage devices, it is unlikely for there to be a significant increase in load when a Java VM is activated and for there to be an increase in the activation time.

[Case where Different Methods are Executed]

Moreover, the Java VM 101 of the embodiment is effective also in the case where different methods are executed among a plurality of Java VMs 101 that share a program profile 102.

Figure 15:
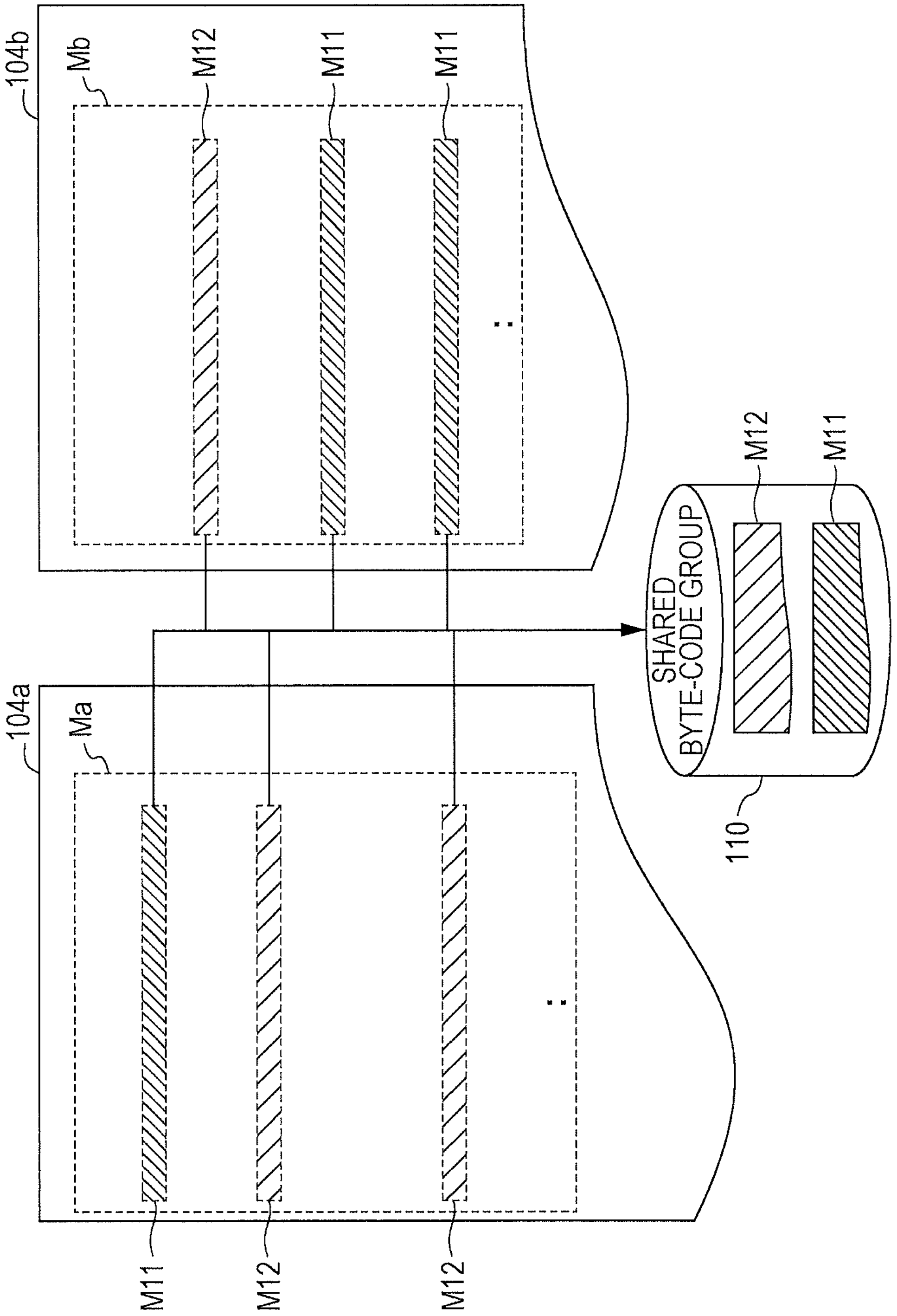
FIG. 15 is a diagram illustrating byte code in which different methods are written, according to an embodiment.

FIG. 15 is a diagram depicting byte code 104*a* and 104*b* in which different methods are written. In this example, common methods M11 and M12 of a common library are called in methods Ma and Mb. The common methods are common methods (file I/O methods, security methods, and the like) that are included in a shared byte-code group 110, as previously described in FIGS. 2A and 2B. The shared byte-code group 110 is retained as byte code 104 within the Java VMs 101.

In the example of FIG. 15, in the case where, for example, the method Ma is executed and the common methods M11 and M12 thus called from the method Ma are converted into an optimized state, the information on the optimized code of the common methods M11 and M12 is stored in the program profile 102. In the case where another Java VM 101 is newly activated in order to execute the method Mb, the common methods M11 and M12 are converted into an optimized state on the basis of the program profile 102 when the Java VM 101 is activated. Since the common methods M11 and M12 have been native-code converted into an optimized state, the other Java VM 101 is able to execute the method Mb quickly.

In this way, also in the case where different methods are executed in a plurality of Java VMs 101, the Java VMs 101, at the time of activation, are able to convert the shared byte-code group 110, which has a high call frequency, into an optimized state. Thus, since the processing speed of the shared byte-code group 110, which is called from methods, is increased, the execution processing speed of the methods is also increased. Furthermore, since common methods having a past record of having been converted into an optimized state often have a high execution frequency, the possibility of being called from a plurality of methods is high. Thus, when a Java VM 101 is activated, common methods having a past record of having been converted into an optimized state are converted into an optimized state, and the processing speed of methods is therefore also increased.

Next, an example of a mode in which a program profile is shared is described.

[Example of a Mode in which a Program Profile is Shared]

Figures 16A, 16B, 16C:
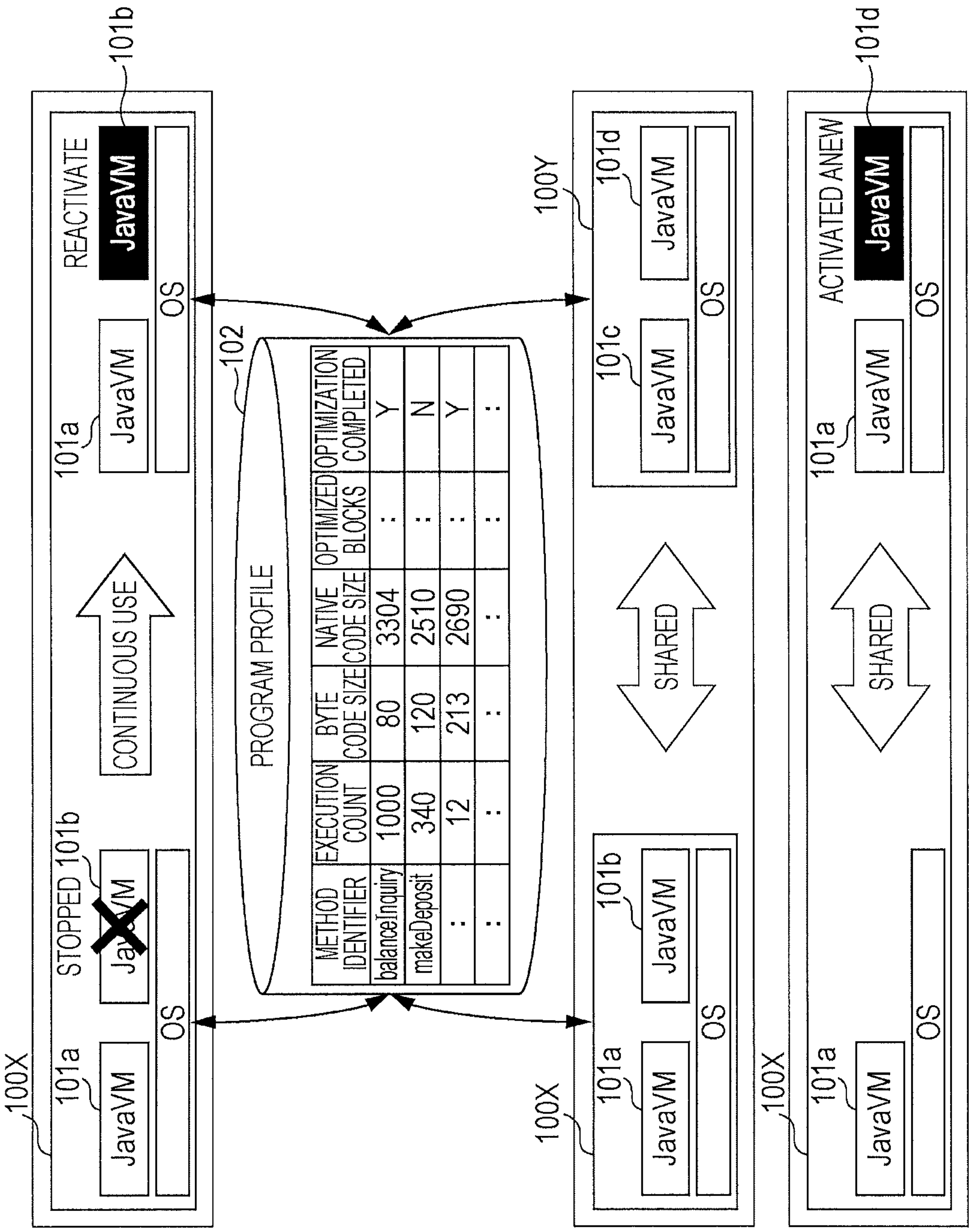
FIGS. 16A-16C are diagrams each illustrating an example of a mode in which a program profile is shared, according to an embodiment.

FIGS. 16A-16C are diagrams each illustrating an example of a mode in which a program profile 102 is shared. FIGS. 16A-16C depict three cases where a program profile 102 is shared. FIG. 16A depicts an example where one Java VM 101*b* is reactivated from among two Java VMs 101*a* and 101*b* running on an OS on the same computer 100×. In this example, the reactivated Java VM 101*b*, at the time of activation, is able to refer to a previously used shared program profile 102. That is, the Java VM 101*b* is able to use the program profile 102 despite having been activated and terminated. Thus, the Java VM 101*b*, at the time of activation, is able to perform conversion to an optimized state with respect to methods, from among execution-target methods, having a past record of having been converted into an optimized state at the time of executing the Java VM 101*a* and at the previous time of executing the Java VM 101*b*.

Furthermore, FIG. 16B is a diagram exemplifying the case where one program profile 102 is referred to and updated in Java VMs 101*a* to 101*d* being executed in different computers 100X and 100Y. In this example, the Java VMs 101*a* and 101*b* are executed in the computer 100X, and the Java VMs 101*c* and 101*d* are executed in the computer 100Y. In this way, the program profile 102 of the embodiment may be shared among a plurality of Java VMs 101 that have been activated on different OSs. Furthermore, FIG. 16C is a diagram exemplifying the case where, in the same computer 100×, a program profile 102 generated by a Java VM 101*a* that has already been activated is referenced and updated by a Java VM 101*d* that has been newly activated. In this way, the program profile 102 of the embodiment may be shared between a Java VM 101*a* that is already present, and a Java VM 101*d* that is newly activated.

In this way, it is possible for the program profile 102 of the embodiment to be shared by a plurality of Java VMs 101 running on different OSs, and by a plurality of Java VMs 101 executed in different time periods. Thus, the efficiency of the program execution processing by the Java VMs 101 is improved.

[Refinement of a Program Profile]

Furthermore, a Java VM 101 of the embodiment is able to automatically generate a program profile 102 by repeatedly executing a method. Therefore, the user does not have to generate the information of the program profile 102 anew. For example, a program profile 102 that is generated in a development environment is used in an operation environment, and as a result a highly precise program profile 102 is generated.

Figure 17:
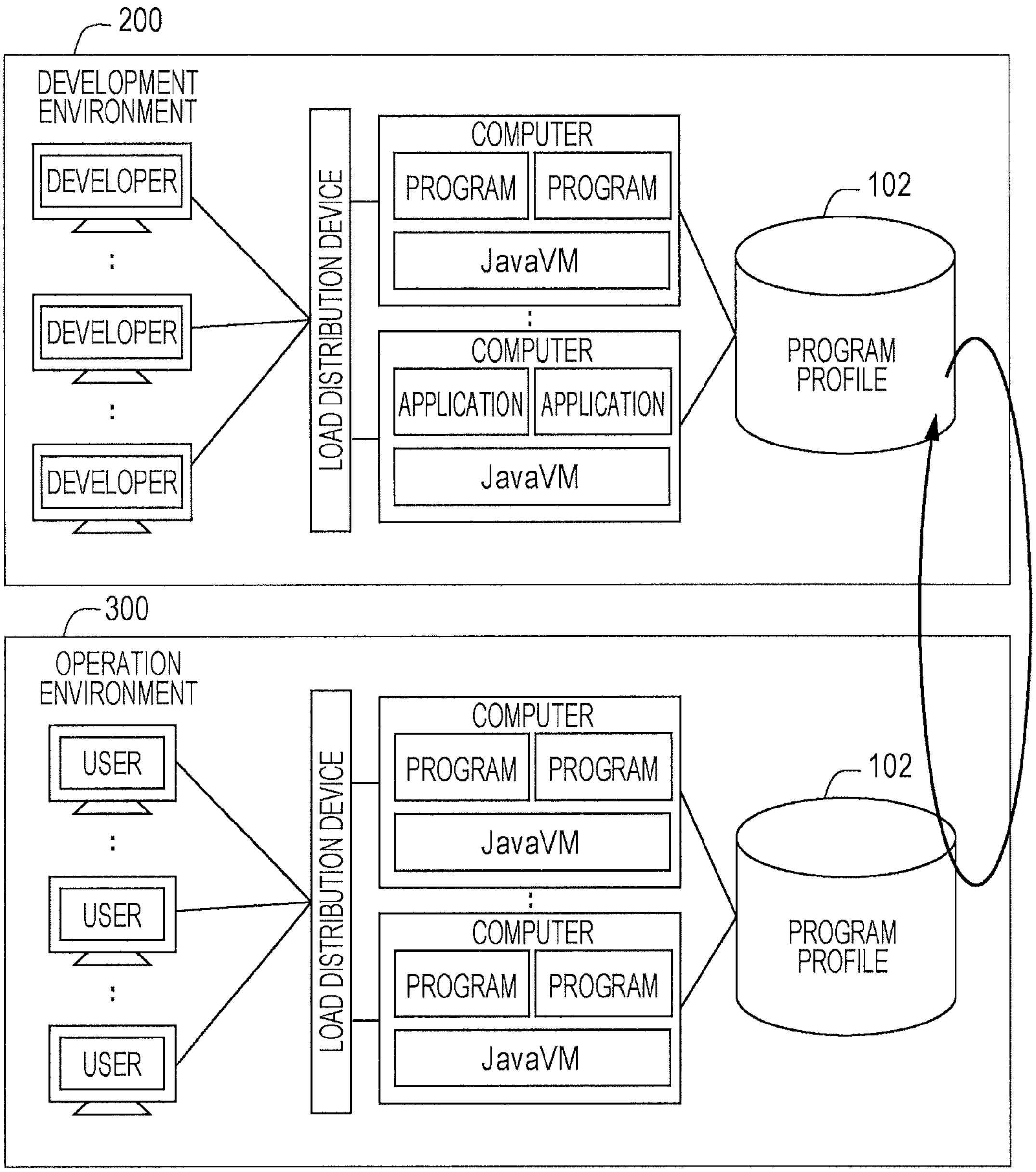
FIG. 17 is a diagram illustrating generation of a program profile having a higher degree of precision, according to an embodiment.

FIG. 17 is a diagram illustrating generation of a highly precise program profile 102. The example of FIG. 17 exemplifies the case where a program profile 102 in a development environment 200 is applied in an operation environment 300. In the development environment 200, generally, tests and so on are performed in which the same system configuration and operation mode as the operation environment are assumed. Therefore, through executing tests and so on in the development environment 200, an effective program profile 102 is automatically generated in the operation environment 300. Thus, labor relating to the generation of a program profile 102 in the operation environment 300 is reduced. Furthermore, by repeatedly updating the program profile 102 in the development environment 200 and the operation environment 300, the information of the program profile 102 is refined, and it becomes possible to generate a program profile 102 having an even higher degree of precision.

[Execution Speed]

Figure 18:
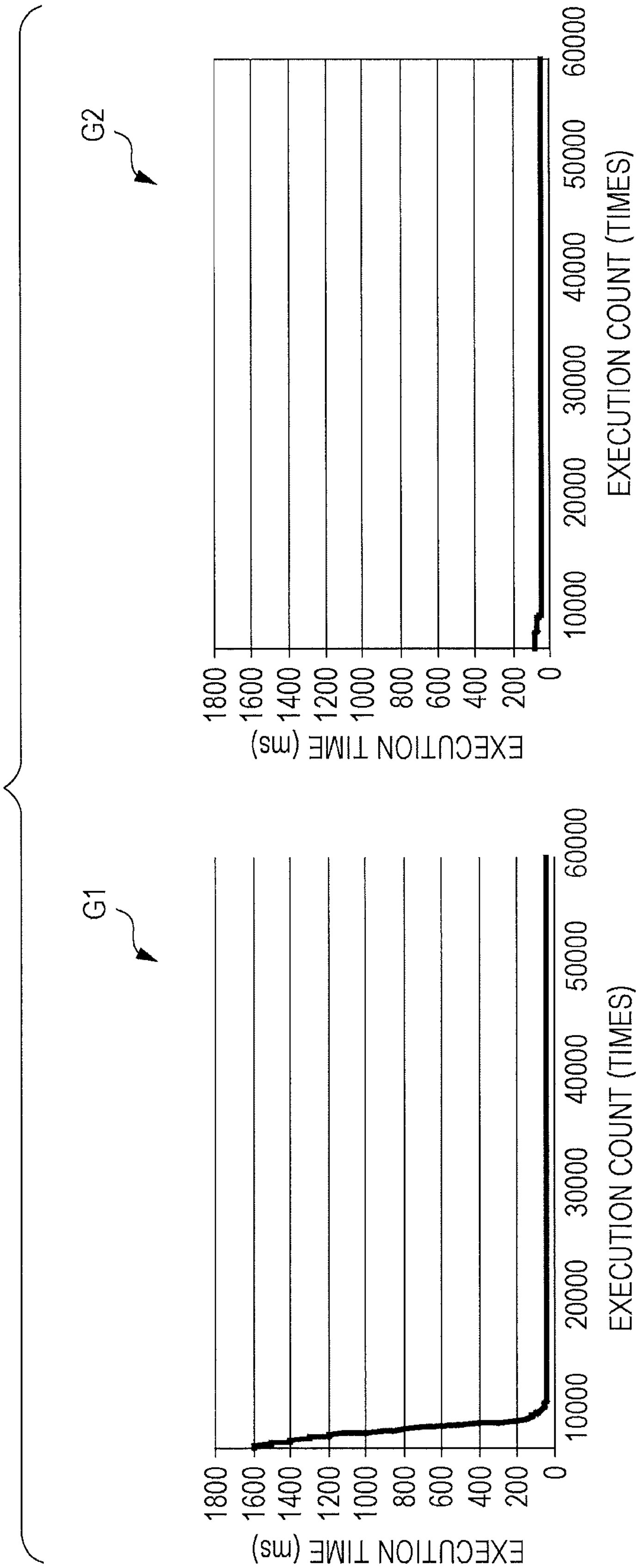
FIG. 18 is a diagram illustrating the speed of executing a program by the Java VM, according to an embodiment.

FIG. 18 is a diagram illustrating the speed of executing a method by the Java VM 101 of the embodiment. FIG. 18 has a graph G1 that depicts the speed of executing a method by a general Java VM, and a graph G2 that depicts the speed of executing a method by the Java VM 101 of the embodiment. The horizontal axes in the graphs G1 and G2 depict the execution count of a method, and the vertical axes depict the execution time (ms) of the method. The graphs G1 and G2 depict the correlation between the execution count and the execution time in the case where a Java VM is activated and the same method is continuously executed.

In the graph G1 that depicts the execution speed of a method in a general Java VM, the execution time decreases exponentially as the execution count of the program increases. To be specific, the execution time is of the order of 1,000 ms when the execution count is approximately 5,000 times, and the execution speed converges at approximately 50 ms when the execution count exceeds approximately 10,000 times. In this way, according to the general Java VM 101, the execution time for the initial execution counts is lengthy, and the execution time improves due to the optimization of the code advancing as the execution count increases.

On the other hand, in the graph G2 that depicts the speed of executing a method in the Java VM 101 of the embodiment, in contrast with the graph G1, the execution time is short from the initial execution counts. In this way, the Java VM 101 of the embodiment is able to execute a method quickly from immediately after being activated. In this way, according to the Java VM 101 of the embodiment, a method is executed in an efficient manner. Moreover, in this example, it is assumed that when the Java VM 101 is activated, there exists a program profile 102 that includes, with respect to an execution-target method, a past record of having been converted into an optimized state and includes information on the optimized code thereof.

As described above, the program execution control processing of the embodiment includes a first conversion operation in which, at the time of executing an execution-target program that is an execution target, byte code in the execution-target program is converted into native code on the basis of a predetermined condition. Furthermore, the program execution control processing includes a determination operation in which, at the time of activation, reference is made to a profile that is from the time of executing the same or another program execution control program, and includes identification information of an optimization-completed program that has a past record of having been converted into an optimized state, and information on optimized code, of the optimization-completed program, that has been converted into native code, and determination is made on the basis of the identification information of the execution-target program as to whether or not the execution-target program corresponds to the optimization-completed program. Furthermore, the program execution control processing includes a second conversion operation in which, in the case where the execution-target program corresponds to the optimization-completed program, at the time of activation, byte code corresponding to the information on the optimized code from among the byte code of the execution-target program is converted into native code.

Thus, the program execution control program of the embodiment, at the time of activation, refers to the program profile and is therefore able to convert, in advance into an optimized state prior to the program being executed, an execution-target program from among execution-target programs (methods) that has a past record of having been converted into an optimized state. Thus, the overhead at the time of executing a program is minimized, and it becomes possible for the program to be executed quickly from the first time of being executed. Furthermore, due to the efficiency of the processing at the time of executing a program being improved and the load being reduced, there is a reduction in the utilization rate of the system resources (processor and memory) of the computer at the time of executing the program.

Furthermore, the program execution control program of the embodiment, at the time of activation, performs conversion into native code for code that it would be effective to convert into native code, rather than for all of the code in an execution-target program. Therefore, the program execution control program of the embodiment, with respect to byte code that is versatile and is not desired to be compiled in advance, is able to perform native code conversion into an optimized state prior to the program being executed while also taking advantage of the convenience of such byte code. Furthermore, in the embodiment, native code conversion processing at the time of activating the program execution control program is suppressed to the minimum desired. Therefore, conversion processing to native code is not performed more than desired, and an increase in the activation time of the program execution control program is avoided.

Furthermore, in the program execution control program of the embodiment, it is possible for a profile to be shared by a plurality of program execution control programs. Therefore, the program execution control program is able to continuously use the profile of the previous time of executing the program, regardless of the program execution control program having been activated and terminated. Furthermore, the program execution control program is able to use a profile generated by another program execution control program. Thus, the program execution control program is able to quickly execute a program from the first time and is able to improve the efficiency of the execution of the program irrespective of changes in the operating environment and whether or not reactivation is performed.

Moreover, in the program execution control program, full garbage collection (full GC) is generally performed in which the memory of both the memory region (heap region) and the non-heap region is released. According to the program execution control program of the embodiment, in the case where the program execution control program is switched due to a full GC for example, it is possible for the information on the optimized code of the execution-target program prior to the switching, to be inherited on the basis of the profile. Thus, even in the case where switching control for the program execution control program by a full GC occurs, the program execution control program of the embodiment is able to quickly execute an execution-target program from immediately after the switching.

Furthermore, in the first conversion operation in the program execution control processing of the embodiment, when an execution-target program is converted into an optimized state, the identification information and the information on the optimized code of the execution-target program are registered in the profile.

Thus, the program execution control program of the embodiment is able to automatically generate a profile by repeatedly executing a program. Thus, the program execution control program does not have to generate a profile anew. Furthermore, the program execution control program is able to generate a profile having a higher degree of precision by sharing a profile in a plurality of environments having similar operation modes for example. In other words, the program execution control program is able to generate a profile having a higher degree of precision by sharing and continuously using a profile.

Furthermore, in the program execution control processing of the embodiment, the time of executing the same or another program execution control program is either or both of the time of executing a program execution control program that is executed at the same time, or the time of executing a program execution control program that is executed in a different time period. Thus, a program execution control program of the embodiment is able to use the profile of the previous time of executing the program, and is able to minimize the decrease in the execution speed of the execution-target program caused by reactivation of a program execution control program.

In the program execution control processing of the embodiment, the time of executing the same or another program execution control program is one of or both of the time of executing a program execution control program that runs on a common operating system, and the time of executing a program execution control program that runs on a different operating system. Thus, the program execution control program of the embodiment is able to share a profile with a plurality of program execution control programs that run on the same OS or on different OSs.

Furthermore, in the first conversion process in the program execution control processing of the embodiment, it is deemed that the execution-target program has been converted into an optimized state when the code sizes of the execution-target program have converged. Thus, the program execution control program is able to determine whether or not a program has been converted into an optimized state, on the basis of the code sizes of the program.

Furthermore, in the first conversion process in the program execution control processing of the embodiment, there being no change in the code sizes before and after the execution of an execution-target program by a standard execution count indicates that the code sizes of the execution-target program have converged. Thus, the program execution control program is able to easily determine whether or not the code sizes of a program have converged.

Furthermore, the predetermined condition in the first conversion process of the program execution control processing is that byte code that is executed a standard number of times or more is converted into native code. Thus, the program execution control program is able to perform conversion into native code for code that it would be effective to compile into native code, from among the byte code of a program. Thus, the program execution control program is able to minimize program code that is to be compiled at the time of reactivation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program-execution control program for causing a computer to execute a program-execution control process by converting at least a portion of a byte code program into a native code, the program-execution control process comprising:

a first conversion process of converting, when executing an execution-target program that is a program to be executed via the program-execution control program, a byte code in the execution-target program into a native code, based on a predetermined condition;

a determination process of determining, upon activating the execution-target program, whether the execution-target program is an optimization-completed program having a past record of having been converted into an optimized state of the execution-target program, based on a profile that includes identification information identifying the optimization-completed program and optimized-code information indicating an optimized code for the optimization-completed program, the profile being updated at a program-execution timing of executing the program-execution control program or another program-execution control program, the optimized code being generated by converting a byte code into a native code; and a second conversion process of converting, when the execution-target program is the optimization-completed program, a byte code corresponding to the optimized-code information indicating the optimized code from among byte codes of the execution-target program, into a native code, upon activating the execution-target program.

2. The non-transitory computer-readable recording medium of claim 1, wherein in the first conversion process, when the execution-target program is converted into the optimized state, the identification information and the optimized-code information indicating the optimized code of the execution-target program are registered in the profile.

3. The non-transitory computer-readable recording medium of claim 1, wherein the program-execution timing includes at least one of a first timing of executing the program-execution control program and the another program-execution control program at a same time, and a second timing of executing the program-execution control program and the another program-execution control program in different respective time periods.

4. The non-transitory computer-readable recording medium of claim 1, wherein the program-execution timing includes at least one of a first timing of executing the program-execution control program and the another program-execution control program that run on a common operating system, and a second timing of executing the program-execution control program and the another program-execution control program that each run on a different operating system.

5. The non-transitory computer-readable recording medium of claim 1, wherein in the first conversion process, it is determined that the execution-target program has been converted into the optimized state when a code size of the execution-target program have converged.

6. The non-transitory computer-readable recording medium of claim 5, wherein in the first conversion process, it is determined that the code size of the execution-target program have converged when there is no change in the code size before and after executing the execution-target program a predetermined number of times.

7. The non-transitory computer-readable recording medium of claim 1, wherein the predetermined condition in the first conversion process is that a byte code that is executed a predetermined number of times or more is converted into a native code.

8. A method for causing a program-execution control program to execute a byte code program by converting at least a portion of the byte code program into a native code, the method comprising:

a first conversion process of converting, when executing an execution-target program that is a program to be executed via the program-execution control program, a byte code in the execution-target program into a native code, based on a predetermined condition;

a determination process of determining, upon activating the execution-target program, whether the execution-target program is an optimization-completed program having a past record of having been converted into an optimized state of the execution-target program, based on a profile that includes identification information identifying the optimization-completed program and optimized-code information indicating an optimized code for the optimization-completed program, the profile being updated at a program-execution timing of executing the program-execution control program or another program-execution control program, the optimized code being generated by converting a byte code into a native code; and a second conversion process of converting, when the execution-target program is the optimization-completed program, a byte code corresponding to the optimized-code information indicating the optimized code from among byte codes of the execution-target program, into a native code, upon activating the execution-target program.

* * * * *